United States Patent

Wiesler et al.

[15] 3,668,044

[45] June 6, 1972

[54] APPARATUS FOR BONDING SEMI-CONDUCTIVE DEVICES

[72] Inventors: Mordechai Wiesler, Lexington; John S. Macintyre, Lynnfield, both of Mass.

[73] Assignee: Teledyne, Inc., Hawthorne, Calif.

[22] Filed: Apr. 9, 1970

[21] Appl. No.: 26,838

[52] U.S. Cl. ..........156/366, 156/556

[51] Int. Cl. ..........B32b 31/20

[58] Field of Search ..........156/556, 73, 362, 366, 306, 156/89, 540, 557; 206/56 A, 65

[56] References Cited

UNITED STATES PATENTS

| | | | |
|---|---|---|---|
| 3,518,756 | 7/1970 | Bennett et al. | 156/89 |
| 3,547,730 | 12/1970 | Cohen et al. | 156/540 |
| 2,294,273 | 8/1942 | Buxbaum | 271/32 |

*Primary Examiner*—Samuel Feinberg
*Assistant Examiner*—Daniel A. Bent
*Attorney*—Morse, Altman & Oates

[57] ABSTRACT

Semi-conductive devices are assembled and bonded to package bases on an automatic basis. The devices are transferred one at a time from a tape indexing unit onto an indexing carrier which convey package assemblies through a heating zone prior to receipt of the dice. The tape indexer includes a drive mechanism adapted to feed a tape carrying a plurality of longitudinally spaced dice past a pick-off point where a vacuum transfer arm moves an individual die from the tape to a pre-positioned and pre-heated package unit on the carrier. The transfer arm includes a vibratory tip to produce a scrubbing motion between the die and the lead to enhance the bonding action between the parts.

11 Claims, 4 Drawing Figures

INVENTORS
MORDECHAI WIESLER
JOHN S. MACINTYRE
BY Moses, Altman & Oates
ATTORNEYS INVENTORS
MORDECHAI WIESLER
JOHN S. MACINTYRE
BY
Morse, Altman & Oates
ATTORNEYS

APPARATUS FOR BONDING SEMI-CONDUCTIVE DEVICES

BACKGROUND OF THE INVENTION

1. Field of the Invention

This invention relates generally to the production of semi-conductive devices and more particularly is directed towards the assembling and bonding of semi-conductive devices to package assemblies on a high speed, automated basis.

2. Summary of the Prior Art

In the production of semi-conductive devices, particularly integrated circuits, there are many problems which arise primarily due to the very small size of the parts being assembled. The size of the part and the requirements for uniform quality make manual assembly techniques impractical for mass production operations. The present invention has for one of its objects the automating of the assembling and bonding of semi-conductive devices to package assemblies. Another object of this invention is to provide as part of an integrated production system automatic apparatus for transferring semi-conductive devices of pre-selected common characteristics from an indexed packaging tape to a bonding station wherein pre-heated and pre-positioned package assemblies are indexed into position for receipt of individual dice.

SUMMARY OF THE INVENTION

This invention features an apparatus for bonding semi-conductive devices to package assemblies on an automatic basis comprising an indexing mechanism adapted to advance a tape carrying semi-conductive devices into position for removal by means of a transfer arm movable from the indexing removal station to a carrier for bonding apparatus. The bonding apparatus includes a longitudinally indexed carrier moving through a heating zone and adapted to carry package assemblies through the heating zone in preparation for receipt of devices transferred from the tape. A vibratory tip serves to enhance the bonding action between the die and the lead unit.

DETAILED DESCRIPTION OF THE PREFERRED EMBODIMENT

Figure 1:
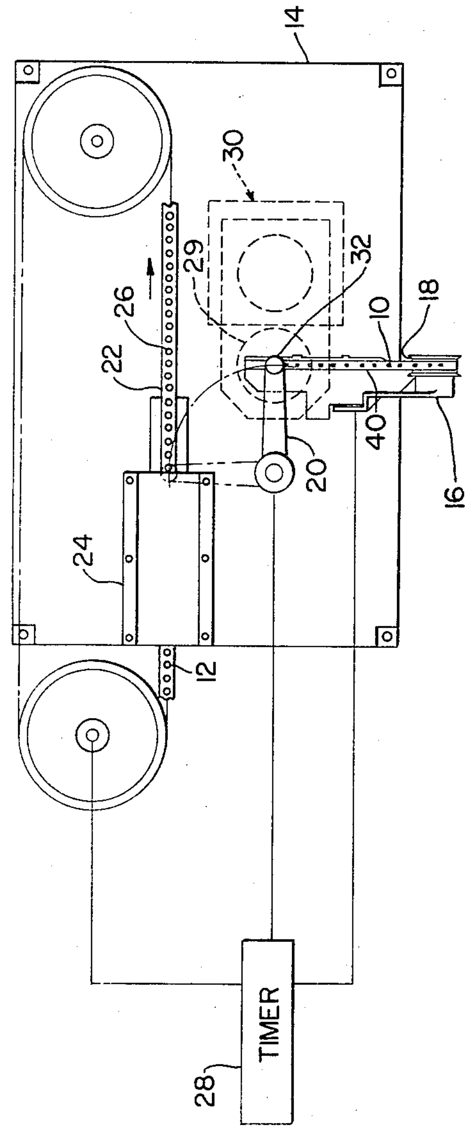
FIG. 1 is a top plan view of an apparatus for assembling and bonding semi-conductive devices and made according to the invention.

Referring now to the drawings there is illustrated in FIG. 1 an apparatus for assembling and bonding semi-conductive dice to packaging assemblies 12 such as wire lead frames, ceramic substrates or the like, on a continuous basis. The apparatus is generally organized about a housing 14 provided with a feed mechanism 16 adapted to index a tape 18 carrying spaced semi-conductive dice 10 to a transfer position for removal and transfer by means of a transfer arm 20 to a conveyor 22. The conveyor 22 passes through a heating zone or oven 24 which preheats the packaging assembly 12 prior to the dice being deposited thereon to form an assembled unit 26 on the conveyor. The conveyor 22 may be driven by means of a stepping motor or other suitable indexing means as are the transfer arm 20 and the die tape indexer 16. The three units are synchronized for cooperating timed operation by means of a timer 28 operatively connected to the drive mechanism for the three units.

The dice 10, in the preferred embodiment, are mounted on the tape 18 of the sort disclosed in co-pending application Ser. No. 866,793 filed Oct. 6, 1969 and entitled "Package for Electronic Devices and the Like", by Mordechai Wiesler, et al. When such tapes are used all of the dice have been pre-sorted so that all dice on the tape will have substantially identical characteristics. Alternative arrangement would be to transfer the dice directly from a wafer 29 mounted directly to a manually positioned or programmed X-Y table shown in outline in FIG. 1. In the alternative arrangement the wafer 29 will have been pre-scored and the individual dice separated from one another but remaining in the same relative position so that individual dice may be removed by the transfer arm. In such a case, the X-Y table 30 is programmed to position sequentially semi-conductive dice to the transfer point, the dice all having common characteristics. The characteristics of the dice are pre-determined by testing techniques and the results recorded on tape or the like for use in driving the X-Y table accordingly.

In practice, it is desirable to achieve a very close and intimate bonding action between each die and the packaging assembly. In order to enhance the bonding action, the transfer arm is provided, preferably at its tip, with a vibration generator 32 adapted to be energized each time the arm is indexed into position for depositing a die onto the wire frame. The vibration generator produces a scrubbing motion between the die and the pre-softened packaging assembly which produces a very superior bond between the parts. Vibration generators such as ultrasonic generators are well known in the art and may be any one of a wide variety available. The generator where used may be operatively connected to the timer 28 for energizing the unit as required.

The conveyor 22 may receive the packaging assembly or a substrate directly from its forming mechanism or the frame may be pre-packaged and wound in a roll in the same fashion as the tape 18 carrying the semi-conductive dice. In any event the conveyor carries the frames through the heating oven which pre-softens the frames just prior to reception of a die as it leaves the tunnel.

The transfer arm 20, in the preferred embodiment, is provided with a vacuum pickup tip 34 and the tip is raised and lowered by various means such as a solenoid operated by the timer or by means of a mechanical cam or the like. In any event, the tip is configured as a collet with a countersunk recess communicating with a central passage connection to a conduit 36 which, in turn, is connected to a vacuum source. The conduit 36 is provided with a valve 38 also connected to the timer 28 and adapted to control the vacuum for first removing the die from the tape and then releasing the vacuum to permit the die to drop onto the packaging assembly.

Figure 2:
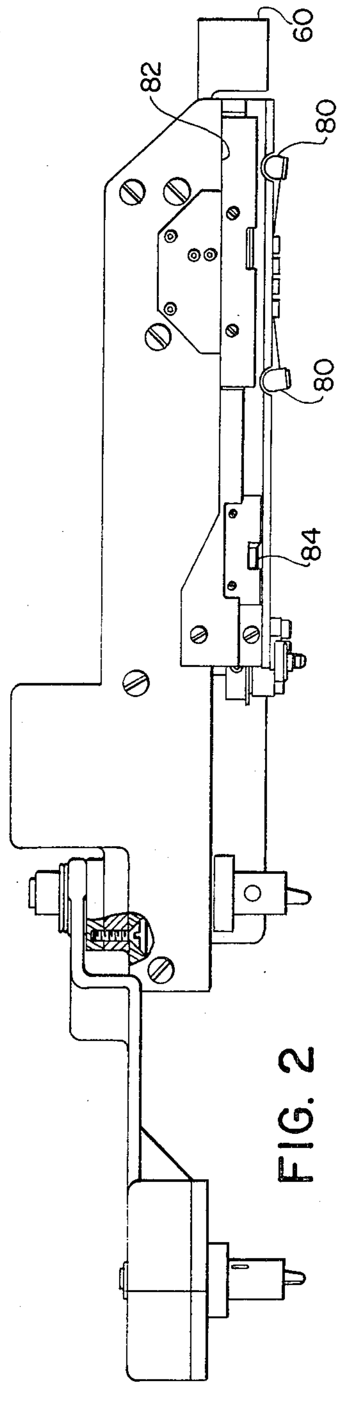
FIG. 2 is a top plan view of a tape indexing mechanism made according to the invention.
Figures 3, 4:
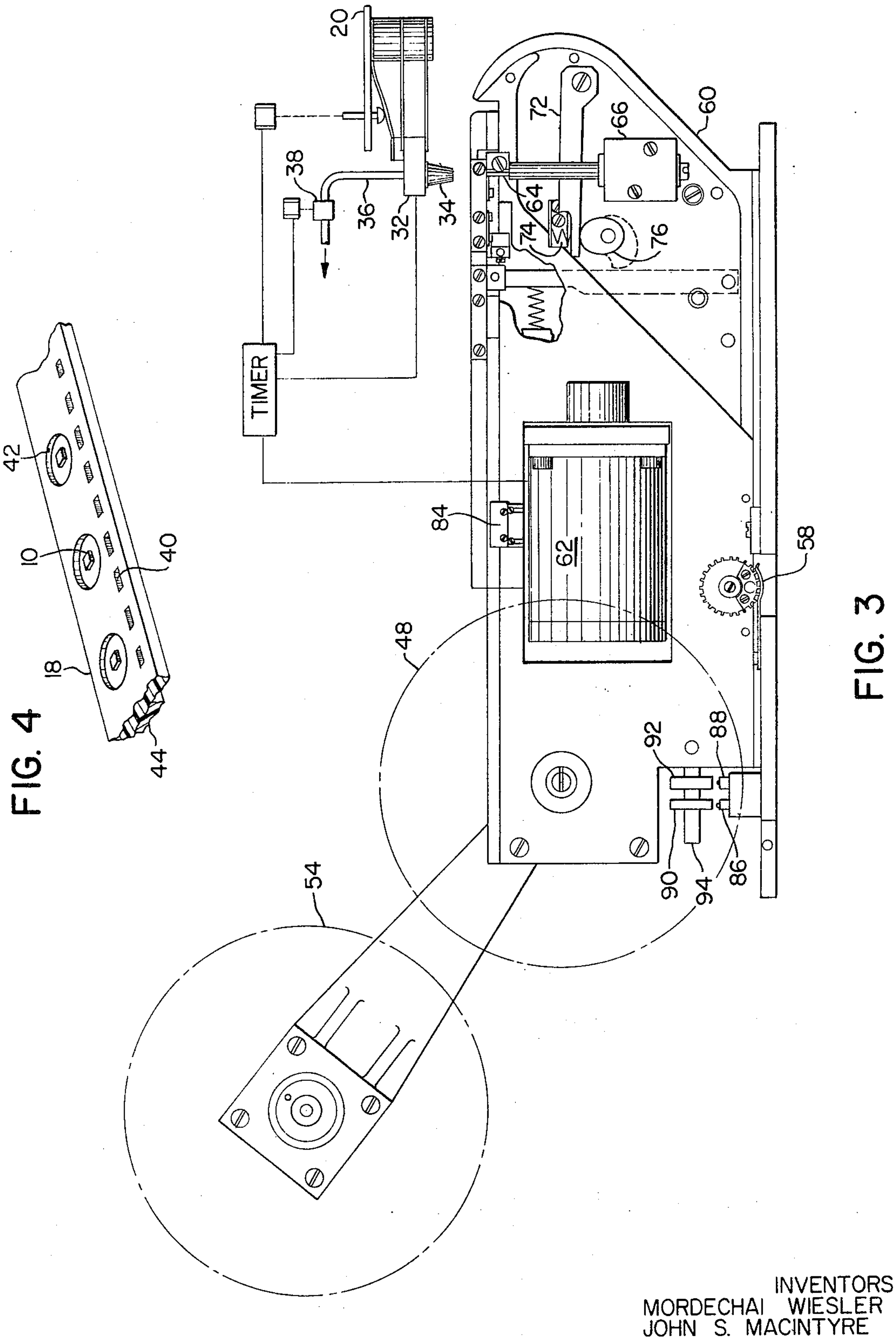
FIG. 3 is a view in side elevation of the FIG. 2 indexer, and, FIG. 4 is a perspective view of a tape used with the indexer.

Referring now more particularly to FIGS. 2, 3 and 4, there are shown details of the tape indexing mechanism 16. Used in the indexer 16 is the tape 18 comprised of a relatively narrow strip formed with indexing sprocket holes 40 along one edge in a manner similar to movie film and storage holes 42 near the other edge of the strip. On the bottom side a thin pressure-sensitive adhesive tape 44 is laminated to the strip 18. The adhesive tape provides an adhesive floor at the bottom of each storage hole. The laminated strip is wound on a feed reel 48 which is mounted to the indexer by a shaft 50 provided on a frame 52. The strip 18 is threaded over an indexing track provided on the indexer to a pickup reel 54.

The indexer includes a sprocket drive 56 and contoured guide plates 58 and 60 which feed the strip 18 onto the upper reach of the indexer before delivering the strips to the reel 54. A motor or solenoid 62 is employed to actuate the indexer. The strip is carried to the upper reach of the indexer where a storage cavity on the strip 18 will come into register with the collet tip 34 and, on signal from the timer, the transfer arm 20 will move the tip over the die with vacuum being applied to the collet tip for picking up the die from the tape. A signal will then be generated to the solenoid 62 to advance the strip so that another strip cavity will be brought into position for the next die. As the strip cavities advance, each die is removed and the empty strip will be wound up on the reel 54 which is drivingly connected to the feed reel 48, the two reels rotating in unison.

The indexer includes a reciprocating needle 64 mounted upright to a rod supported in a bearing block 66 and reciprocated by means of a pivotally mounted arm 72 urged downwardly by means of a spring 74 and pivoted upwardly by means of a cam 76.

The indexer includes spring loaded bumper guides 80 at the top of the unit adjacent the upper tape track for maintaining the tape precisely in position along the track by bearing against one edge of the tape to keep it running along an opposite wall 82. The take up reel 54 is provided with a slip clutch to insure that a constant tension is maintained on the tape.

Various control switches are provided in the indexer. An end-of-tape microswitch 84 is located along the upper reach of the tape track to sense the end of the tape and signal accordingly. Microswitches 86 and 88 are mounted adjacent rotary timing cams 90 and 92 carried by a shaft 94 for cyclically indexing the tape and the actuating the needle punch mechanism.

What is claimed is:

1. Apparatus for assembling semiconductive components comprising in combination
   a. indexing conveyor means adapted to transport one class of components along a first path,
   b. means for transporting another class of components along a second path spaced from said first path,
   c. transfer means movable between said paths and adapted to remove a component from said conveyor means and mount it to a component on said transporting means,
   d. timing means connected to said conveyor means, said transporting means and said transfer means for cooperating timed operation thereof,
   e. conditioning means located adjacent at least one of said paths for conditioning at least one of said components for bonding engagement with the other component,
   f. first means movable to and away from a tape supporting spaced components thereon along said first path and perpendicular to the plane thereof in position opposite a component indexed into registration therewith for pushing said component from said tape, and
   g. second means positionable opposite said first means to receive the separated component.

2. Apparatus according to claim 1 wherein said conditioning means includes a heat source for heating said components.

3. Apparatus according to claim 1 wherein said transfer means includes a movable collet connected to a vacuum source for picking up said component for transfer between said conveyor means.

4. Apparatus according to claim 1 including vibrating means operatively connected to said transfer means for imparting a vibratory motion between said components when one is assembled to the other.

5. Apparatus according to claim 1 wherein conveyor means includes an X-Y positioning table.

6. Apparatus according to claim 1 wherein said transfer means includes an arm pivotal from a position over said first path to a position over said second path and a component engaging member mounted to said arm for picking up and releasing components on signal.

7. Apparatus according to claim 5 wherein said table is programmed.

8. Apparatus according to claim 5 wherein said table is manually positioned.

9. Apparatus according to claim 1 wherein said first means is a reciprocating needle.

10. Apparatus according to claim 1 wherein said second means is a collet.

11. Apparatus for assembling semiconductive components comprising in combination
   a. indexing conveyor means adapted to transport one class of components along a first path,
   b. means for transporting another class of components along a second path spaced from said first path.
   c. transfer means movable between said paths and adapted to remove a component from said conveyor means and mount it to a component on said transporting means,
   d. timing means connected to said conveyor means, said transporting means and said transfer means for cooperating timed operation thereof,
   e. conditioning means located adjacent at least one of said paths for conditioning at least one of said components for bonding engagement with the other component,
   f. said conveyor means including a tape drive mechanism for indexing a tape supporting spaced components thereon along said first path,
   g. said mechanism including a reciprocating needle movable to and away from said tape and perpendicular to the plane thereof in position opposite a component indexed into registration therewith for pushing said component from said tape, and
   h. said transfer means includes a collet positionable opposite said needle to receive the separated component.

* * * * *